United States Patent

Fetherston

[15] 3,682,331

[45] Aug. 8, 1972

[54] RACK LOADING AND UNLOADING APPARATUS

[72] Inventor: Robert Theodore Fetherston, 3461 Gila Drive, San Jose, Calif. 95122

[22] Filed: Sept. 8, 1970

[21] Appl. No.: 70,174

[52] U.S. Cl. ............... 214/16.4 R, 198/20 T, 198/89
[51] Int. Cl. ............................................. B65g 1/16
[58] Field of Search....198/20 T; 214/16.4 R, 16.4 A, 214/6 G

[56] References Cited

UNITED STATES PATENTS 2,956,696   10/1960   Drakengren ...... 214/16.4 R X
3,019,925   2/1962    Gray ................ 214/16.4 R X Primary Examiner—P. Arnold
Attorney—Walter Kruger

[57] ABSTRACT

The apparatus provides for loading heavy articles such as mold boards which support roof tiles onto a rack while simultaneously unloading mold boards from a different section of a rack. The loading-unloading arrangement includes an infeed conveyor and a first loading arm, and an unloading arm and outfeed conveyor. The infeed conveyor is supported by the loading arm and the outfeed conveyor is supported by the unloading arm. A pulley and chain arrangement interconnects the loading and unloading arms so that the weight of the infeed conveyor and loading arm and the articles thereon counterbalances the weight of the outfeed conveyor and unloading arm and the articles thereon. Hence, the loading and unloading systems are effectively counterbalanced by each other even when the several conveyors transport mold boards supporting heavy tiles.

18 Claims, 15 Drawing Figures

INVENTOR
ROBERT T. FETHERSTON

BY WALTER KRUGER
ATTORNEY

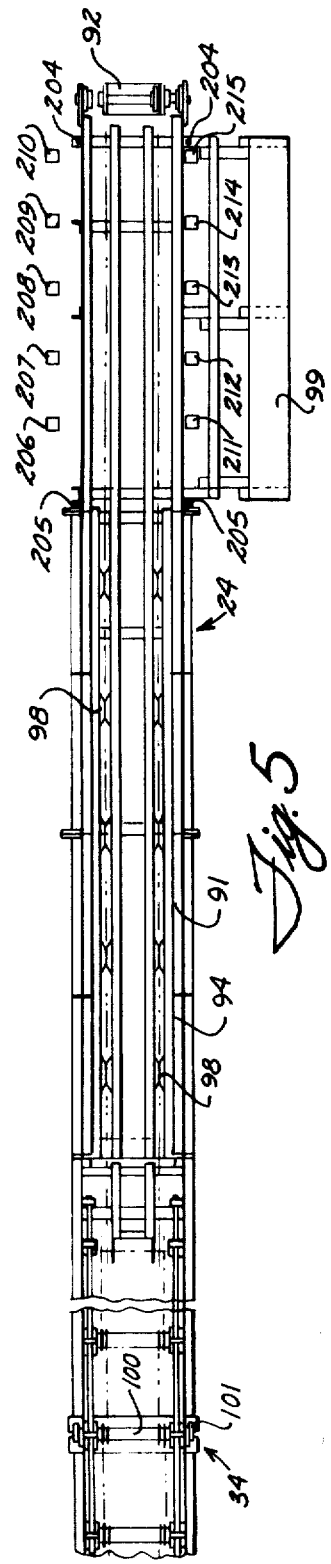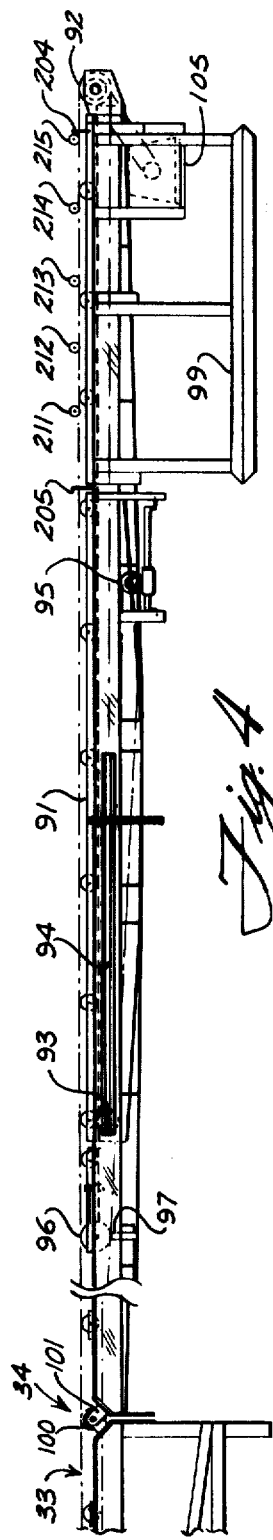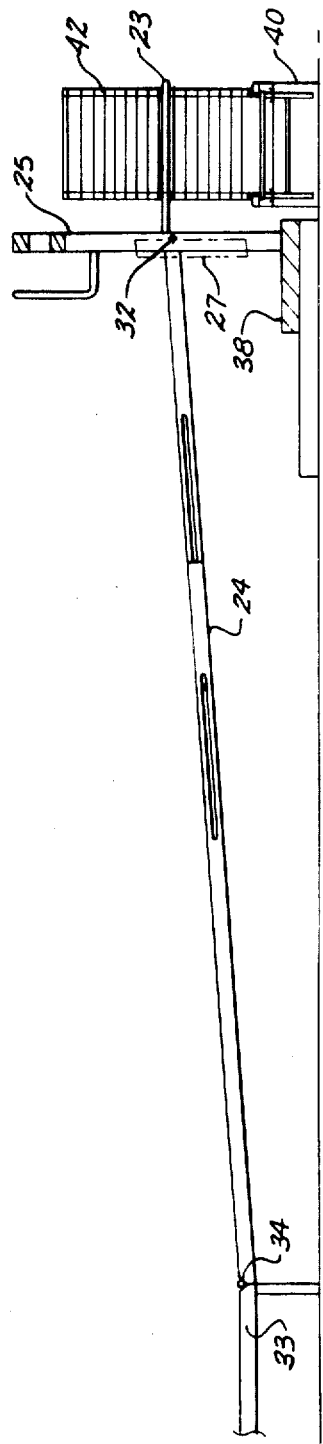

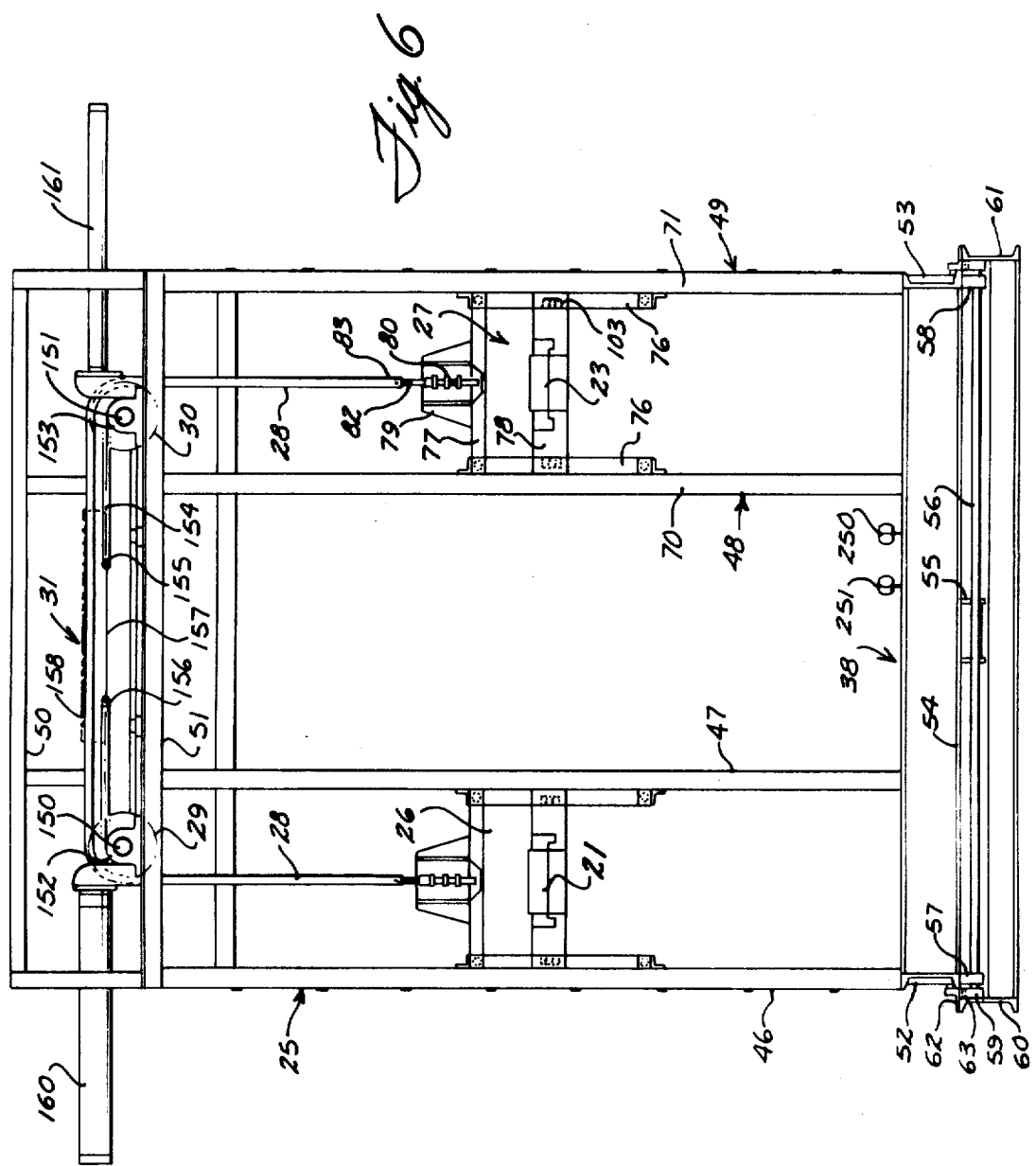

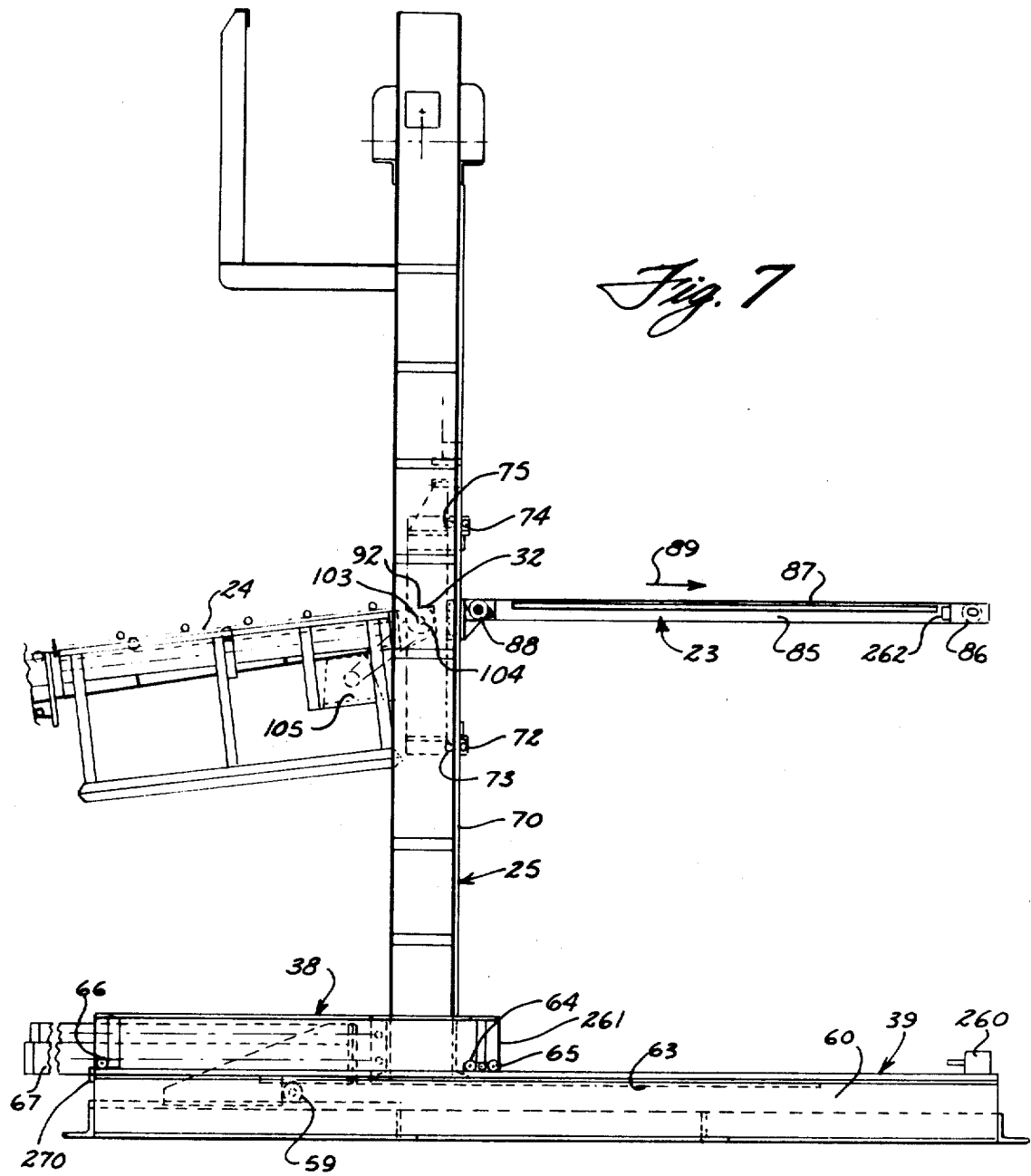

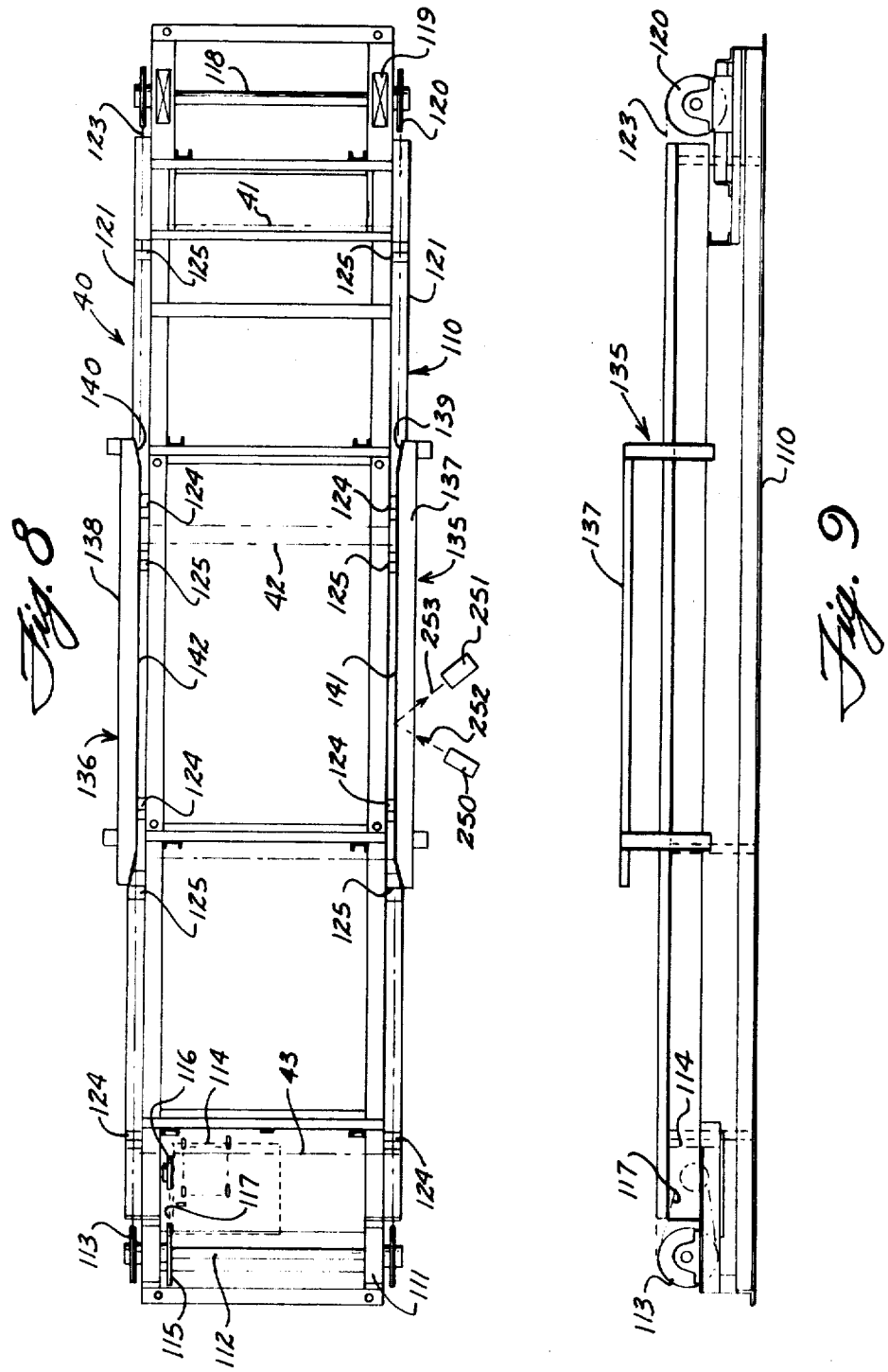

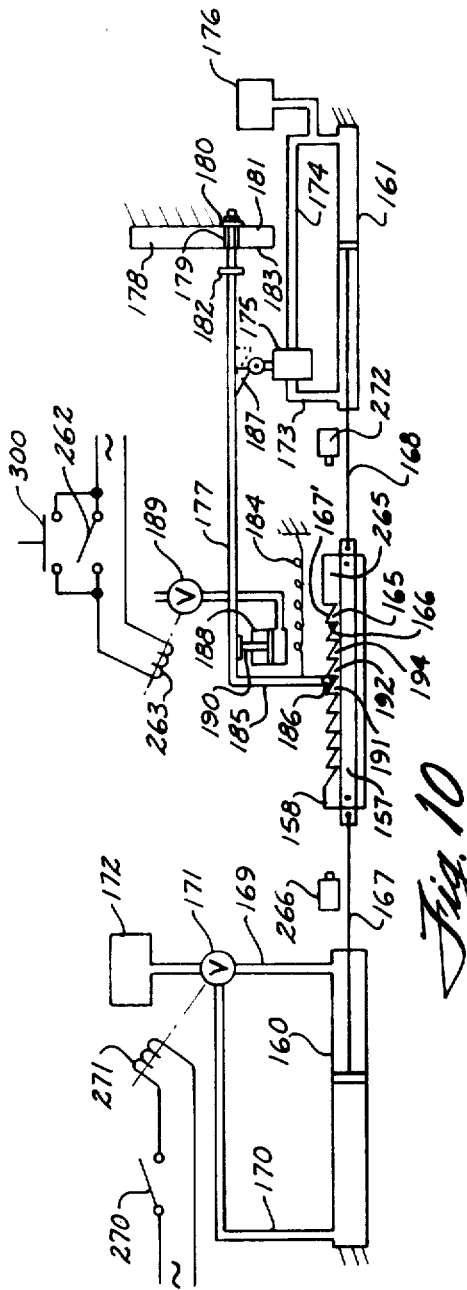
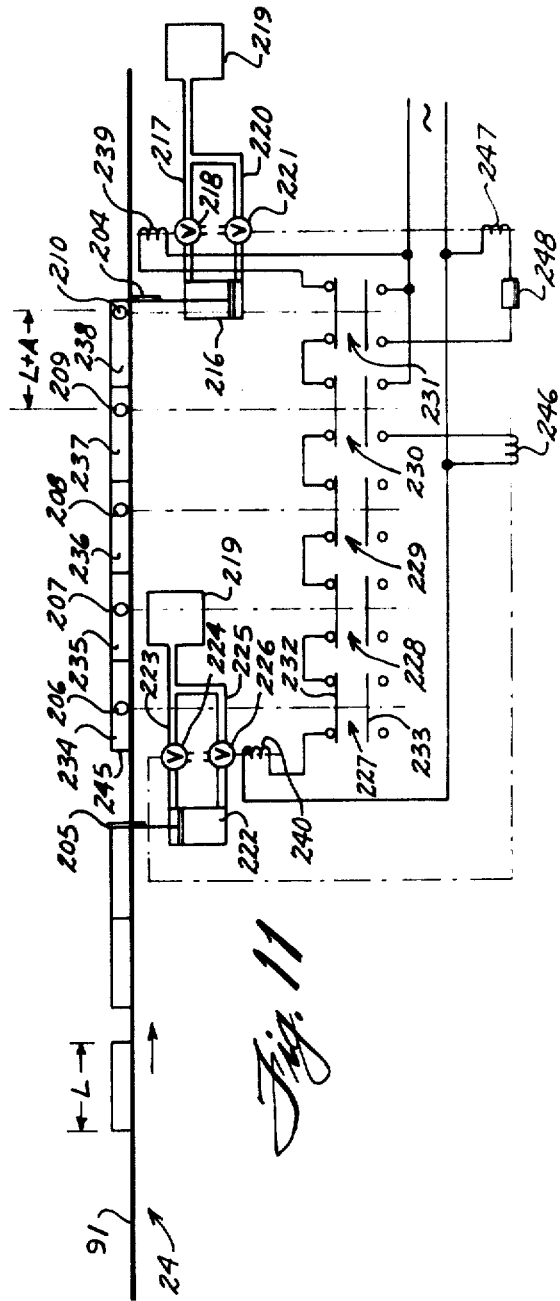
Fig. 10
Fig. 11

RACK LOADING AND UNLOADING APPARATUS

This invention relates to apparatus for loading, unloading, or simultaneously loading and unloading articles from a rack of the type having several rows of aligned pairs of upwardly facing ledges with a space between opposed pairs of the ledges to receive a conveyor arm which is indexed vertically between the ledges of a row. While the apparatus of this invention has other uses, it finds particular utility for loading and unloading mold boards or pallets used in the manufacture of concrete roof tile.

In the manufacture of concrete roof tile, each tile is molded on a pallet or mold board to provide the bottom configuration of the tile. To provide durable and smooth faced tiles, the boards are generally die-cast from an aluminum alloy. Immediately after the tiles are formed, they are termed "wet tiles" and are very limp and susceptible to damage. While the tiles are wet, the mold boards must be handled carefully, since impact and vibration can distort or otherwise damage the tiles.

To reduce the number of mold boards required, the mold boards with the wet tiles formed thereon are placed in a rack which is transferred to a curing oven which rapidly dries and cures the tiles so they harden and can readily be handled.

Machinery for forming tiles and other like articles from concrete and clay, which require curing, is well known in the prior art. While such machinery is relatively inexpensive, the cost of molds and curing ovens becomes quite significant where it is desired to operate the machinery continuously. Ordinarily, enough mold boards are required to run the forming machinery continuously and correspondingly, enough oven space is required to cure the entire output of the tile forming machinery. Needless to say, the initial investment in mold boards and curing ovens is quite substantial.

Applicant has found that the number of mold boards, and correspondingly, the money invested in mold boards, can be kept to a minimum by operating the tile forming machinery intermittently in such a manner that tiles are unloaded from the mold boards as soon as the tiles are cured, and the mold boards then available are immediately fed to the tile forming machinery where new "wet tiles" are formed on the mold boards.

Hence, this invention relates to rapid and efficient apparatus for implementing the manufacture of roof tile and other similar articles while maintaining the number of mold boards required at a minimum. In accordance with this invention, the apparatus provides for automatic loading of one row of a rack with mold boards supporting wet roof tile, while simultaneously unloading mold boards supporting cured roof tile from a second row of a rack. The invention also includes a first conveyor for transporting the molds supporting wet roof tile to the rack loading assembly of the apparatus and a second conveyor for conveying molds supporting cured tile from the unloading apparatus to suitable machinery for removing the cured tile from the molds. As soon as the cured tiles are removed from the mold boards, these mold boards are immediately routed to the tile making machinery so the most possible use is obtained from each of the mold boards.

In order to obtain the maximum use from each of the mold boards, all mold boards are filled with wet tile and placed on the curing racks. The racks are then immediately moved to the curing oven. As soon as the tiles are cured, the racks are removed from the curing oven and the mold boards are immediately unloaded from the racks. During the initial stages of the unloading, there are no mold boards for forming wet tiles. Hence, it is initially necessary to unload one or several rows of the mold boards without simultaneously loading mold boards supporting wet tiles on an empty rack. The apparatus of this invention is so arranged that it can be operated to selectively unload mold boards from the rack without simultaneously loading other mold boards onto a rack, and vice versa. In addition, after all the racks are unloaded, there will still be mold boards available for forming additional wet tiles. Hence, at the completion of a tile forming operation, there will be mold boards loaded onto a rack without simultaneously unloading mold boards from a rack.

However, during most of the loading and unloading operations, mold boards containing cured tiles will be unloaded from one rack while simultaneously, mold board containing wet tiles will be loaded onto another rack. A unique feature of this invention is that the infeed conveyor and the loading conveyor are connected to the outfeed conveyor and unloading conveyor arm in such a manner that the assemblies counterbalance each other and are vertically indexed simultaneously to precisely position the respective arms for loading and unloading. Hence, the loading and unloading systems are effectively counterbalanced by each other even when the several conveyors are transporting mold boards supporting heavy tiles.

In accordance with applicant's invention, the racks on which the mold boards are loaded and from which the mold boards are unloaded are of the type having a plurality of pairs of ledges, each pair being spaced apart horizontally to receive a loading or unloading arm which extends horizontally into the space and is indexed vertically. In the preferred embodiment of applicant's invention, there is an unloading arm and a loading arm. The loading arm includes a horizontal conveyor chain which is continuously driven in a forward direction to convey mold boards into position slightly above a pair of ledges of the rack. The unloading arm also includes a horizontal conveyor chain which is continuously driven, but in a rearward direction to convey mold boards lifted by the conveyor chain to the outfeed conveyor. An indexing arrangement precisely positions the arms vertically so that when the horizontal chain of the loading arm is slightly above a pair of ledges of one rack, the horizontal chain of the unloading arm is slightly below a pair of ledges of another rack. Advantageously, the arms are indexed automatically as soon as the required number of mold boards to fill a shelf reach the proper position on the loading arm. The loading arm is then automatically indexed downwardly to deposit its mold boards on the rack and simultaneously the unloading arm is indexed upwardly to lift the bottom tier of mold boards from the other rack. As the unloading conveyor conveys mold boards from the rack, one or a group of mold boards are conveyed into the other rack and this process is repeated until all the mold boards are unloaded from one row and another row is completely loaded with mold boards containing wet tile.

Correspondingly, an object of this invention is a unique automatic apparatus for simultaneously unloading mold boards or like objects from one rack and loading mold boards onto another rack.

Another object is an apparatus including a horizontal conveyor chain type loading arm and a horizontal conveyor chain type unloading arm which apparatus is selectively operable to either load mold boards or pallets on a rack, or unload mold boards or pallets from a rack, or to simultaneously load mold boards on one rack and unload mold boards from another rack.

A further object is a rack loading apparatus in which there is a loading conveyor system including a horizontal conveyor arm, and an unloading conveyor system including a horizontal conveyor arm, the two systems being interconnected with each other in such a manner that these systems counterbalance each other.

A further object is a system according to the immediately preceding object in which the two conveyor arms are simultaneously indexed, one up and one down by a common mechanism to provide for simultaneous precise positioning of the respective arms.

A still further object is a loading and unloading conveyor arrangement, each including continuously driven conveyors, control of the loading and unloading operations being affected by proper indexing of the conveyor arms vertically and arranging mold boards to be loaded in groups of the proper number to completely fill a shelf or tier of the rack.

A further object is a unique support and indexing mechanism for simultaneously lowering the loading arm a predetermined distance and lifting the unloading arm the same predetermined distance.

Another and sill further object is an arrangement of the type described, wherein both unloading arms are mounted on a common support adapted to be moved forward to a position in which the unloading arm extends through one row of a rack to be unloaded and the loading arm extends through another row of a rack to be loaded, and in which the support is retractable to a position in which the rack or racks can be moved transversely of the arms to align new rows of the racks with the respective arms.

Another and still further object is an apparatus of the type described, wherein both the loading and unloading arms include continuously driven conveyors, and the loading and unloading is automatic without manual intervention.

Another and further object is a unique conveyor for moving racks to be loaded and unloaded in a direction transversely of the loading arms, the conveyor including means to automatically align a row of one rack with the loading arm and a row of another rack with the unloading arm.

Another and still further object is a unique mechanism for indexing the loading and unloading arms vertically simultaneously, in step by step fashion, and which mechanism may be used for other purposes to obtain precise indexing motion.

Numerous other features, objects, and advantages of the apparatus of this invention will become apparent with reference to the drawings, which form a part of this specification, and in which:

FIG. 3 is a side view, in section, taken along line 3—3 of FIG. 2;

FIG. 4 is an enlarged view, in side elevation, of the infeed conveyor (which is identical to the outfeed conveyor) of this apparatus;

FIG. 5 is a top plan view of the conveyor of FIG. 4;

FIG. 6 is an enlarged front view, in elevation, of the loading arm supporting frame and its associated parts;

FIG. 7 is a side elevational view of the apparatus of FIG. 6, but on a slightly larger scale than as shown at FIG. 6;

FIG. 8 is a top plan view of the rack conveyor of this apparatus on which racks to be loaded and unloaded are placed and which conveys the racks in a direction transversely of the loading and unloading arms;

FIG. 9 is a front elevational view of the rack conveying apparatus of FIG. 8;

FIG. 10 is a schematic showing the details of the conveyor arm indexing mechanism of this invention;

FIG. 11 is a view in schematic of the apparatus for arranging pallets in a group in closely abutting end-to-end relation;

Figure 1:
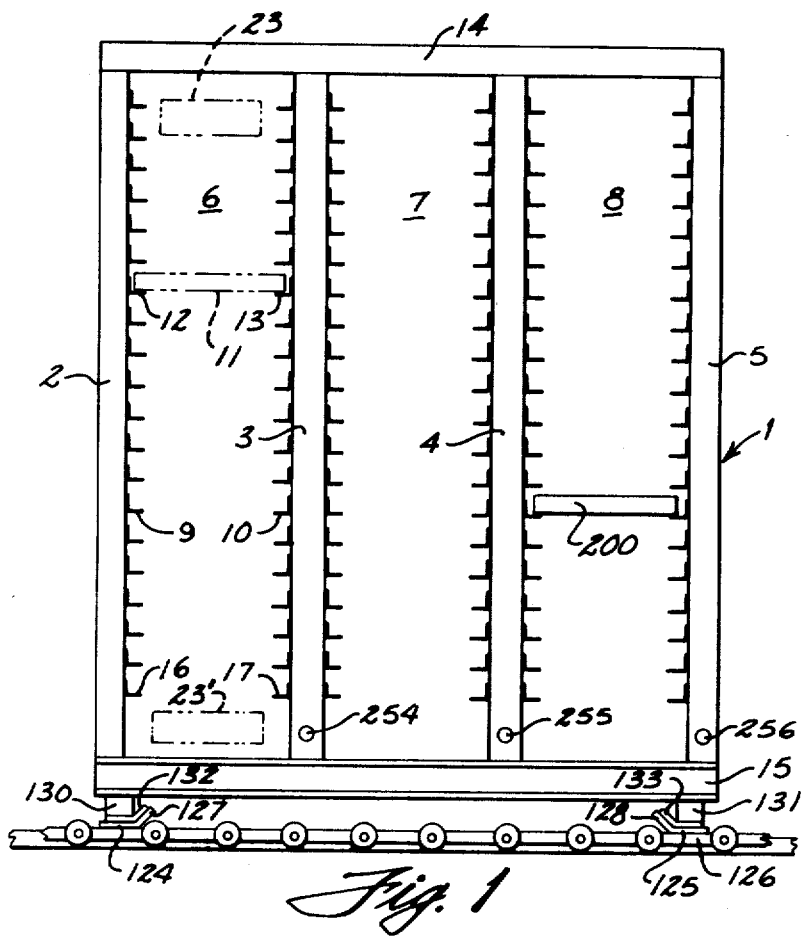
FIG. 1 is a front elevational view of a rack showing the rack mounted on supports of the chain of a rack conveyor.

Referring now to the drawings in detail, FIG. 1 shows the type of rack which is loaded with pallets or mold boards, and from which pallets or mold boards are unloaded by the apparatus of this invention. As shown, rack 1 includes parallel upright supports 2–5 which define rows 6–8. Each row includes a plurality of mold board supporting structures in the form of ledges 9 secured to one side of a row, and ledges 10 secured to the opposite side of the row. The ledges 9 of a row are formed from lenghts of angle iron, each of a length to extend from the front to the rear of the rack, and are equally vertically spaced apart from each other. Similarly, the ledges 10 are formed from lengths of angle iron and are equally vertically spaced from each other. The ledges 9 and 10 of each row are arranged respectively in aligned opposed pairs so a mold board or pallet 11 (shown in phantom lines) placed on, for example, the ledges 12 and 13 is supported horizontally. It will be observed with reference to FIG. 1 that each of the rows 6–8 is substantially open and unobstructed between top cross members 14 and bottom cross members 15 to permit moving a loading or unloading arm vertically through a row from the top to bottom of the rack. In addition, it will be observed that the bottom ledges 16 and 17 of each row are spaced from the top of cross member 15 a distance sufficient to allow moving a loading or unloading arm in a fore and aft direction relative to the rack without disturbing mold boards on the bottom ledges of a row.

Figure 2:
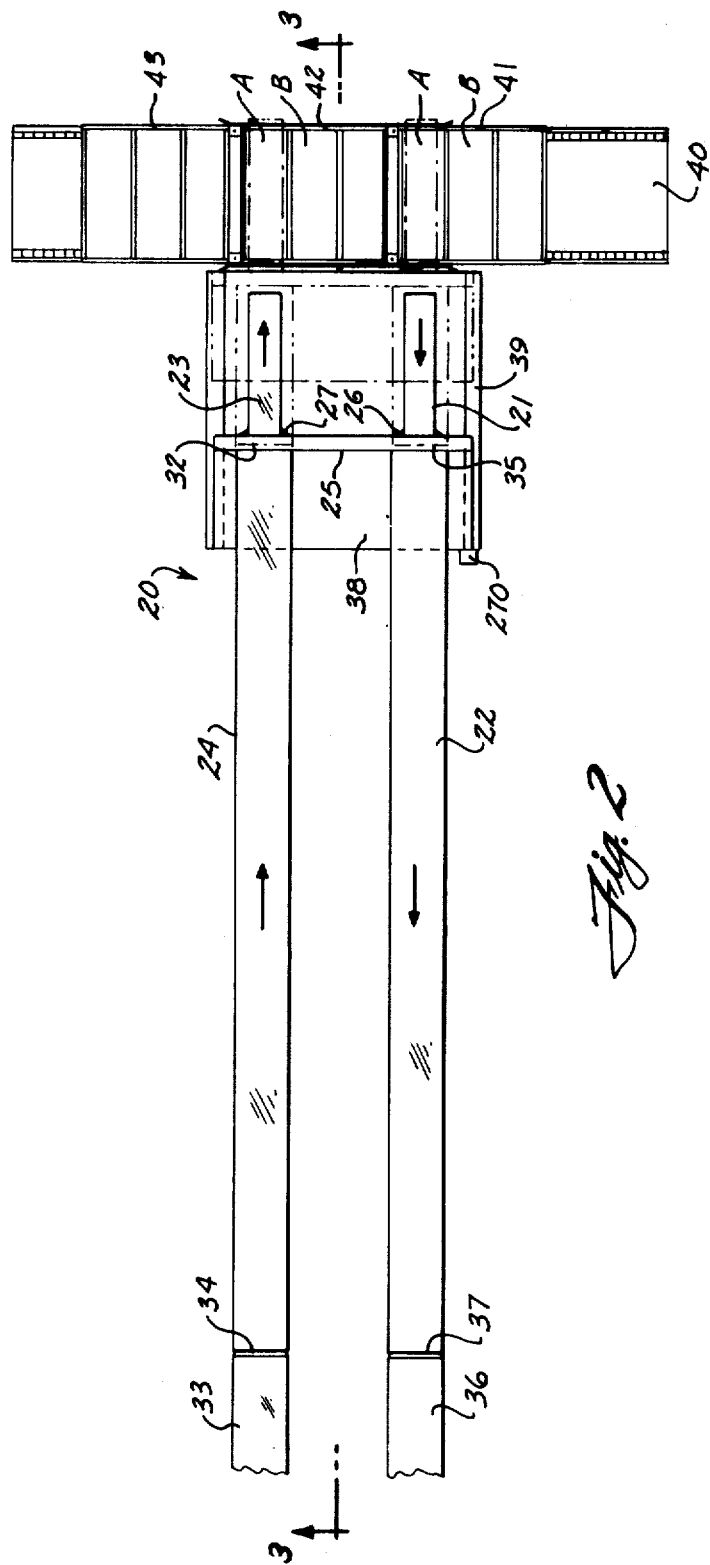
FIG. 2 is a diagrammatic top lan view of the rack loading apparatus of this invention.

With reference to FIG. 2, there is shown the loading and unloading conveyor system 20 of this invention. System 20 includes a rack unloading arrangement including an unloading conveyor arm 21, and an outfeed conveyor 22. The system also includes a rack loading arrangement including a loading conveyor arm 23 and an infeed conveyor 24.

Conveyor arms 21 and 23 are mounted on an upright supporting frame 25 (FIGS. 2 and 6). The loading conveyor arrangement including conveyor arm 23 and infeed conveyor 24 are identical to the unloading conveyor arrangement including unloading conveyor arm 21 and outfeed conveyor 22, save that the top flight of the respective conveying mechanisms move in opposite directions as shown by the arrows at FIG. 2.

As shown at FIG. 6, unloading conveyor arm 21 is mounted on a carriage 26 and loading conveyor arm 23 is mounted on a carriage 27. The carriages are supported on frame 25 for vertical movement. Carriage 26 is connected to carriage 27 by a chain 28 which passes over sprockets 29 and 30 mounted for rotation on frame 25. Sprockets 29 and 30 form a part of an indexing assembly 31 which functions to simultaneously index the carriage 27 for loading arm 23 downwardly as the carriage 26 for unloading arm 21 is indexed upwardly.

Referring now to FIGS. 2 and 3, infeed conveyor 24 has its right hand end pivotally connected to the carriage 27 for loading arm 23 at a pivot connection 32. The left hand end of infeed conveyor 24 is pivotally connected to a fixed infeed conveyor 33 at a pivot connection 34. Similarly, the right hand end of outfeed conveyor 22 is connected to the carriage 26 for unloading arm 21 at a pivotal connection 35, and the left hand end of the outfeed conveyor is connected to a fixed outfeed conveyor 36 at a pivot connection 37. Hence, as arms 21 and 23 are moved up and down, the angle of inclination of the conveyors 22 and 24 relative to a horizontal plane, also changes. Since the distance between pivot connection 32 and pivot connection 34 changes as does the distance between pivot connection 35 and pivot connection 37, as the arms are indexed up and down, both conveyors 22 and 24 are of the telescoping type to compensate for this change in distance as arms 21 and 23 are indexed vertically.

Frame 25 includes a rearwardly extending lower frame 38. Lower frame 38 is mounted on a base 39, fixed to the floor of the work area, where the apparatus is installed. The arrangement is such that the assembly, including frame 25 and lower frame 38, are movable between the solid line and phantom line positions of FIG. 2. Extending transversely in front of base 39 is a rack conveyor 40. The rack conveyor is so constructed that a rack 1, of the type described with reference to FIG. 1, and which is loaded on the conveyor, is transported transversely of the unloading arm 21 and loading arm 23. As shown at FIG. 2, there are three racks 41–43 in side by side relation to each other on rack conveyor 40. With the racks positioned as shown, moving frame 25 and lower frame 38 forwardly to the phantom line positions causes loading arm 23 to enter Low in of rack 42, and unloading arm 21 to enter row A of rack 41. As will subsequently be described in detail, unloading arm 21 unloads pallets from each shelf or pair of ledges of row A of rack 41, while loading arm 23 simultaneously loads pallets onto the ledges or shelves of row A of rack 42. Pallets unloaded by unloading arm 21 are transferred to outfeed conveyor 22 which conveys the pallets to the fixed outfeed conveyor 36 from which the pallets are sent to a de-palletizer for removing cured roof tiles from the pallets. The pallets to loading arm 23 come from a tile forming machine (not shown) which forms concrete tiles on the pallets. Pallets supporting wet tile are conveyed along fixed infeed conveyor 33, are transferred to infeed conveyor 24, and are conveyed to loading arm 23. After row A of rack 42 is loaded and row A of rack 41 is simultaneously unloaded, rack conveyor 40 is actuated to move the racks to a new position in which row B of rack 42 is aligned with loading arm 23 and row B of rack 41 is aligned with unloading arm 21. Of course, the loading arms 21 and 23 are moved to the retracted position shown in solid lines at FIG. 2 before the racks are indexed and are then advanced to the phantom line positions after the racks have been indexed to their new positions.

As shown at FIG. 2, the rack 43, (which is already loaded with pallets supporting wet tiles) is in a position to be removed from rack conveyor 40 with a fork lift truck, and is then transferred to a curing oven (not shown).

Referring now to FIGS. 6 and 7, frame 25 includes upright columns 46–49 which are secured to lower frame 38. The frame 25 also includes a top beam 50 which joins the upper ends of columns 46–49 and a transverse support 51 below beam 50 and on which indexing assembly 31 is mounted. Columns 46–49 are rigidly secured, as by welding, to lower frame 38 and extend perpendicularly upwardly from the lower frame.

Lower frame 38 is fabricated from structural steel members including spaced apart channels 52 and 53 at opposite sides of the frame. Secured between channels 52 and 53 is a support plate 54. Extending downwardly from the support plate are trunions 55 through which a transversely extending shaft 56 extends. Shaft 56 is mounted for rotation on lower frame 38 by bearings 57, 58 secured respectively to channels 52 and 53 and which bearings extend downwardly below support plate 54. Fixed to the ends of shaft 56 are pinion gears 59.

Base 39 includes a pair of spaced apart parallel C-beams 60 and 61. Secured to the top of each beam is a flat track plate 62. Secured to the bottom of each plate 62, at a location inwardly of its associated C-beam, is a gear toothed rack 63. Racks 63 are so positioned that they mesh with pinion gears 59 at the opposite ends of shaft 56. The top surface of track plate 62 is engaged by rollers 64–66 secured to the channels 52 and 53 for rotation and projecting outwardly to engage the top face of the track plates. It will be noted with reference to FIG. 7, that rollers 64 and 65 are mounted slightly in front of frame 25, whereas roller 66 is at the rear of lower frame 38. It will also be noted with reference to FIG. 7, that racks 63 are each elongated and extend a substantial distance longitudinally of the beams 60 and 61. Rollers 64–66, pinion gears 59, racks 63 and track plates 62 cooperate to mount lower support frame 38 and frame 25 for movement along base 39. The rack, pinions, and rollers cooperate to precisely guide frame 25 and lower frame 38 linearly relative to base 39 when it is necessary to advance or retract the conveyor arms relative to rack conveyor 40. By virtue of the downwardly facing rack 63 and pinion gears 59, there is no tendency whatever for frame 25 or sub-frame 38 to tip from a horizontal position even when pallets supporting concrete tiles weighing several hundred pounds are supported on the loading and unloading arms.

Frames 25 and 38 and the respective loading and unloading arms are advanced and retracted by fluid cylinders 67,68 connected between base 39 and lower frame 38. During such movement, pinion gears 59 remain in mesh engagement with racks 63 to guide frame 38 linearly.

Carriage 26 is identical to carriage 27, unloading arm 21 is identical to loading conveyor arm 23, and outfeed conveyor 22 is identical to infeed conveyor 24. Hence, only the loading arrangement, including infeed conveyor 24 and loading arm 23, of these identical assemblies will be discussed in detail, it being understood that the unloading assemblies are identical.

Referring again to FIGS. 6 and 7, a flat plate 70 is secured to the front face of column 48 and a flat plate 71 is secured to the front face of column 49. Plates 70 and 71 are each elongated, extend the length of the respective columns, and have portions extending inwardly of the sides of the columns in a direction toward the carriage 27. The inwardly extending portions of the plates 70 and 71 form a track which cooperates with opposed rollers 72–75 at the sides of carriage 27. Rollers 72 and 73 are parallel and spaced apart and are mounted for rotation adjacent the lower end of the vertically elongated side arms 76 of carriage 27. Rollers 74 and 75 are mounted for rotation on parallel axes on arms 76 at a location above loading conveyor 23. The nip or space between the rollers is such that the rollers bear respectively against the front and rear surfaces of the respective plates 70 and 71 to permit carriage 27 to be moved up and down in the vertical plane defined by the guide plates 70 and 71.

Carriage 27 (FIG. 6) includes a top cross member 77 extending between and secured to the arms 76. There is also an intermediate cross member 78, spaced from and parallel to cross member 77, and which is also secured to and extends between arms 76. Loading conveyor arm 23 is rigidly supported on intermediate member 78. A connector plate 79 is secured to cross member 77 at a location centrally of carriage 27 and extends upwardly therefrom. Secured to plate 79 is an internally threaded sleeve 80. A threaded connecting rod 82 is threaded into sleeve 80, and the upper end of the rod is secured to end 83 of chain 28. The threaded connection between rod 82 and sleeve 80 provides for precisely adjusting the height of loading arm 23 relative to end 83 of the chain.

As shown at FIG. 7, loading arm 23 is elongated and includes a vertically thin, but rigid support frame 85 having an inner end secured to carriage 27. At the outer end of frame 85 is a roller 86 around which conveyor chain 87 extends. Chain 87 also extends across a roller 88 at the inner end of frame 85. During operation of the apparatus, the chain of loading arm 23 moves in a direction to carry pallets toward the free end of the arm adjacent roller 86, as designated by the arrow 89. Unloading arm 21 and its associated carriage 26 are identical in construction to the loading arm 23 and carriage 27. During operation, the only difference between these arms is that the conveyor chain of the unloading arm 21 moves in a direction to carry pallets toward outfeed conveyor 22.

FIGS. 4 and 5 show infeed conveyor 24. Infeed conveyor 24 is of the telescoping type which can be lengthened and shortened while pallets are transported by its conveyor belt 91. To provide for telescoping of the conveyor, belt 91 extends over a drive roller 92 at the right hand end of the conveyor, then extends rearwardly and around a first idler roller 93 secured to a telescoping frame 94, then extends forwardly and around a second idler roller 95 from which it extends rearwardly and is guided between the nip of a roller pair including rollers 96 and 97, and then extends rearwardly to form the belt for fixed infeed conveyor 33. This provides the customary S-shaped compensating loop for telescoping conveyors. The frame 94 is secured to the right hand portion of infeed conveyor 24 for movement with the right hand end as the conveyor is extended. Frame 94 includes a slidable connection which both permits a slight extension, as well as slight contraction of the conveyor during up and down movement of loading arm 23, as well as sufficient contraction and extension to permit extending and retracting the conveyor arm by moving carriage 38 between its retracted and forward positions on base 39.

As shown at FIG. 5, the telescoping connection between frame 94 and the left hand end of conveyor 24 includes a plurality of rollers 98 which provide for free sliding movement of frame 94 in the conveyor. In the position shown at FIGS. 4 and 5, conveyor 24 is completely telescoped and is arranged to be extended by moving frame 94 and correspondingly, idler roller 93 to the right as a pull is exerted on the right hand end of the conveyor.

It will be observed that the pivot connection 34 at the left hand end of conveyor 24 includes a shaft 100 and bearings 101 which allow the entire conveyor to pivot about the pivot connection 34 during operation of the apparatus. Secured to infeed conveyor 24, adjacent its right hand end, is an operator supporting platform 99 where an operator may be stationed during use of the apparatus. It will be observed that this platform 99 is completely supported by infeed conveyor 24 so the operator is lifted and lowered as the right hand end of conveyor 24 moves up and down with loading arm 23.

As shown at FIG. 7, drive roller 92, at the right hand end of infeed conveyor 24, is mounted in bearings 103 which are secured to the opposite sides of carriage 27. The bearings 103 pivotally mount shaft 104 of roller 92 to form the pivot connection 32 previously referred to with reference to FIG. 2. Conveyor belt 91 is driven by a power source 105, including an electric motor and reduction gear drive unit, which is controlled in a manner which will subsequently be described in detail. Conveyor chain 87 extends around sprockets driven by drive roller 92. Hence, chain 87 and belt 91 are each driven in the same direction and at the same speed by power source 105.

As previously stated with reference to FIG. 2, rack conveyor 40 extends transversely in front of base 38. Referring now to FIGS. 8 and 9, rack conveyor 40 is elongated and includes a frame 110 secured to the floor of a building where the apparatus of this invention is installed. Mounted in bearings 111 at one end of frame 110 is a shaft 112 having sprockets 113 keyed to its opposite ends for rotation with the shaft. Also supported by frame 110 is a drive assembly 114 in the form of a motor-reduction gear unit which drives shaft 111 via a sprocket 115 keyed to shaft 112, a sprocket 116 keyed to the output shaft of the drive assembly, and a chain 117 which interconnects the sprockets 115 and 116. At the opposite end of frame 110 is a shaft 118 parallel to shaft 112, and which is mounted for rotation in bearings 119. Sprockets 120 are keyed to the opposite ends of shaft 118 for rotation with the shaft. A three-lobe cam (not shown) timed to rotate at one revolution per row of a rack serves as a means to start the rack conveyor slowly, accelerate the conveyor to a higher velocity during a major portion of the index movement, and decelerate the conveyor to a slower speed slightly before conveyor motor 105 is stopped. This arrangement provides for slow starting and stopping of the conveyor so delicate wet tile on a rack is not damaged. The lobes of the cam control suitable switches or rheostats in series with the motor 105 to provide the acceleration and deceleration cycle.

Figure 1A:
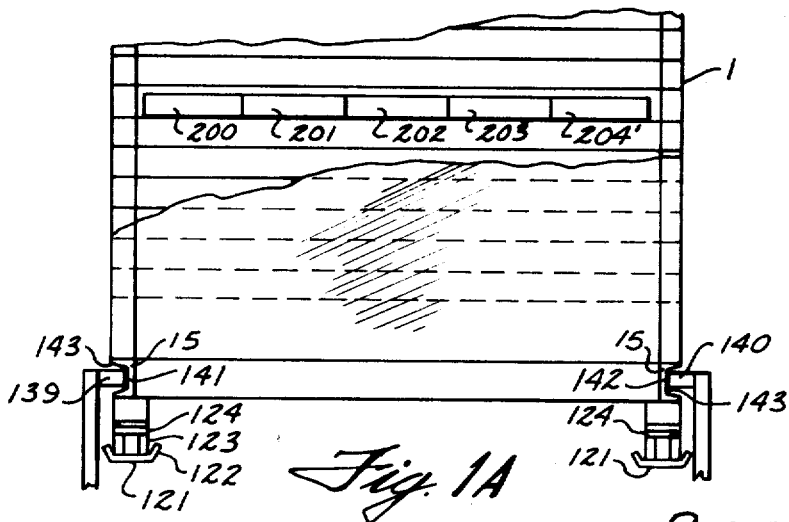
FIG. 1A is a fragmentary side view in elevation of the arrangement of FIG. 1.

Rack conveyor 40 includes a pair of parallel chain tracks 121 which extend respectively along the opposite sides of the conveyor and substantially span the distance between shaft 112 and shaft 118. Tracks 121 are each generally U-shaped and open upwardly as shown at FIG. 1A. Each track is formed from a C-shaped channel member having upstanding sides 122 which function as guides for rack conveyor chains 123. There are two chains 123 which extend respectively around the sprockets 113 and 120 at each side of the rack conveyor (FIG. 8). Each chain has a plurality of pairs of rack supporting pads 124, 125 (FIGS. 1 and 8) secured to its links 126. The pads have a width, as measured transversely of rack conveyor 40, which is slightly greater than the width of chain 123. Pad 124 has a tip 127 (FIG. 1) which extends upwardly at an angle and toward pad 125. Similarly, pad 125 has a tip 128 extending upwardly at an angle in a direction generally toward pad 124. The pads 124 and 125 are so arranged on the respective chains of the conveyor that a pad 124 of one chain is transversely aligned with a pad 124 of the other chain. Similarly, pads 125 on each chain are transversely aligned with each other. By virtue of the cooperation of sprockets 113 and 120 with the chain, this alignment is maintained since each chain is driven the same distance whenever the drive motor-reduction unit 114 is energized. Pads 124 and 125 cooperate with chains 123 to provide a means for conveying a rack through the rack conveyor. With reference to FIG. 1, it will be observed that the rack is elevated by legs 130 and 131 which project downwardly from bottom cross member 15. Secured to the bottom of leg 130 is a pad 132 with a bottom surface of the same configuration as pad 124. Secured to the bottom of leg 131 is a pad 133 having a bottom surface of the same configuration as the top surface of pad 125. The distance between pads 132 and 133 is the same as the distance between pads 124 and 125, and correspondingly, a rack positioned on the rack conveyor, as shown at FIG. 1, is in a predetermined registered position on the rack conveyor.

The spacing between the respective pairs of pads 124 and 125 is quite significant to proper operation of this automatic rack loading and unloading apparatus. As previously explained with reference to FIG. 2, a rack 41 can be unloaded as a rack 42 is simultaneously loaded. To accomplish such loading and unloading, row A of rack 41 is in precise alignment with unloading arm 21, whereas row A of rack 42 is in precise alignment with loading arm 23. Hence, it can aptly be stated that the spacing between pairs of pads 124 and 125 which support a rack, and the spacing between rows of a rack is such that a row of one rack, for example, row A of rack 42 is precisely aligned with the loading arm 23 whenever a row of a second rack, for example, rack 41, row A, is precisely aligned with unloading arm 21, that this precise alignment depends on the equal spacing between the several rows of each rack, as well as the spacing between the several sets of pads 124, 125. For further clarification, attention is directed to the location of the racks 41–43 (shown in phantom lines) at FIG. 8.

Secured to the sides of frame 110 and projecting upwardly therefrom are guide assemblies 135 and 136. Guide assembly 135 constitutes a front guide assembly, whereas guide assembly 136 constitutes a rear guide assembly. The function of these guide assemblies is to assure that each rack which is being loaded or unloaded is positioned so its shelves or ledges are precisely parallel with the loading and unloading arms 21 and 23 and to assure that the front of a rack is always the same distance from the front of base 39. Guide assembly 135 includes a guide rail 137, whereas guide assembly 136 includes a guide rail 138. As shown for guide rail 137, the guide rails are vertically thin. In addition, guide rail 137 has an angled leading end 139 and guide rail 138 similarly has an angled leading end 140. The spacing between the facing surfaces 141 and 142 of guide rails 137 and 138 is essentially the same as the distance between the inner surfaces 143 (FIG. 1A) of bottom cross members 15 of a rack. Since pads 124 and 125 merely hold the rack for longitudinal movement along rack conveyor 40 with chain 123, but do not precisely position the rack transversely of the rack conveyor, guide rails 137 and 138 are necessary to perform this function. Because of the necessary clearance between the chains 123 and the sides 122 of their tracks 121, such precise positioning of the rack would not be obtained even if transverse locating members were connected to the pads.

When drive unit 114 is started, chains 123 are driven to convey a rack in a direction from the right hand end to the left hand end of rack conveyor 40, as viewed at FIGS. 2, 8 and 9. A rack is deposited on the rack conveyor 40 while a pair of pads 124 and 125 are located to the right of the entrance guide portions 139 and 140 of guide rails. While the operator of the fork lift truck can approximately position the rack transversely of the conveyor, it is impossible to position the rack precisely. Hence, the operator of the fork lift truck used to transport the racks merely deposits a rack in such a manner that its pads 132 and 133 engage pads 124 and 125 of the rack conveyor. Then, when power unit 114 is started, chains 123 transport the rack toward guide rails 137 and 138. A mis-aligned rack will engage the front guide portions 139 and 140 of the respective rails and will be guided to a precise position transversely of the rack conveyor. The manner in which a row of a rack is precisely aligned with a loading or unloading arm will subsequently be described in detail.

Indexing assembly 31 will now be described in detail. As previously described with reference to FIG. 6, chain 28 extends around sprockets 29 and 30. Sprocket 29 is keyed to a shaft 150 and sprocket 30 is keyed to a shaft 151. Also keyed to shaft 150 is a smaller diameter sprocket 152, and also keyed to shaft 151 is a smaller diameter sprocket 153. Extending around sprockets 152 and 153 is an indexing chain 154. The respective ends 155 and 156 of chain 154 are connected to an elongated bar 157. Secured to bar 157 is a toothed rack 158 which is located in a plane spaced behind bar 157, as viewed at FIG. 6.

Secured to cross member 51 is an air cylinder 160, and secured to cross member 51 at the opposite side of frame 25 is a hydraulic cylinder 161. Cylinders 160 and 161 have their respective piston rods aligned and connected to the opposite ends of bar 157, and hence, are effectively secured to rack 158.

FIG. 11 shows this arrangement diagrammatically and will be referred to for the following explanation of the operation of the indexing mechanism, as well as additional details of the mechanism. As shown at FIG. 10, rack 158 has ten teeth 165 formed in its upper surface. (While only ten teeth are shown, it is to be understood that the number of teeth 165 will equal the number of shelves or pair of ledges of a rack. Hence, since rack 1 of FIG. 1 has 20 shelves, an equal number of teeth will be provided on rack 158). Each tooth 165 has a vertical front face 166 and a downwardly sloping rear face 167' which connects to the front face of an adjacent tooth. Piston rod 167 of air cylinder 160 is connected to one end of bar 157 and piston rod 168 of hydraulic cylinder 161 is connected to the other end of bar 157.

Air cylinder 160 has an air supply line 169 connected to its piston rod end and a line 170 connected to its other end. The lines connect to a valve 171, which is of the four-way type, which admits air from air supply 172 to the piston end and vents the other end when the valve is in one position, and vents the piston end and admits air to the other end when the valve is in a second position.

Hydraulic cylinder 161 has a flow line 173 connected to its piston rod end and a flow line 174 connected to its head end. Lines 173 and 174 connect to a valve 175, and the flow of fluid from line 173 to line 174 is controlled by the valve. A reservoir 176 for hydraulic fluid is connected to line 174.

An index trip rod 177 has one end loosely connected to a fixed plate 178. As shown, the end of the rod extends through an opening 179 which is somewhat larger than the diameter of the rod, so the rod can be lifted and lowered at least a slight amount. A washer 180 functions as a stop to limit movement of the rod to the left when stop 180 engages surface 181 of the plate 178. Also secured to the rod is a collar 182, which limits the extent of movement of the rod 177 toward surface 183 of the plate under the action of spring 184. Rod 177 is generally L-shaped and has a downwardly extending front portion 185 provided with a horizontal pin 186 which is received in the space between teeth 165. Trip rod 177 carries a cam 187, which in the position shown, closes valve 175 so there is no flow through lines 173 or 174. Located beneath rod 177 is a pneumatic trip cylinder 188, air flow to which is controlled by a valve 189.

Since valve 171 is normally in a position to admit air from source 172 to the piston end of cylinder 160, piston rod 167 normally exerts a force on rack 158 tending to move the rack toward the left, but which movement is resisted by hydraulic cylinder 161 acting on the incompressible liquid filling the piston end of the cylinder and line 173. However, as soon as valve 175 opens, this resisting force is gone and piston rod 167 moves to the left, thereby moving rack 158 to the left a distance equal to the space between teeth 165, as will now be described.

When trip cylinder 188 is actuated by opening valve 189, the following indexing operation occurs. Actuating trip cylinder 188 momentarily moves piston rod 190 upwardly to lift pin 186 upwardly out of the space between teeth 191 and 192. As soon as trip rod 177 is lifted, it is immediately pulled to the right by spring 184 and pin 186 drops down against the top of tooth 192 and into engagement with vertical front face 166 of tooth 194. With pin 186 on tooth 192, cam 187 moves to the right, to the dotted line position, in which valve 175 is open. The valve remains open until the vertical front face 166 of tooth 194 again moves rod 177 to the left to its initial or starting position in which cam 187 closes valve 175. With valve 175 closed, the piston of cylinder 161 cannot move further to the left against the action of the trapped incompressible liquid in the piston end of cylinder 161. Hence, movement of the rack is arrested even through a force is still exerted on the rack by the air pressure in the piston rod end of cylinder 160.

The number and spacing of teeth 165 on rack 158 corresponds to the number of and is proportional to the spacing of the rack shelves. Because chain 154 extends around sprockets 152 and 153, which are of smaller diameter than the sprockets 29 and 30, the actual distance that bar 157 and rack 158 move during each indexing cycle is somewhat less than the distance that chain 28, and hence carriages 26 and 27 are indexed each time the rack is indexed. However, because the sprockets 29 and 30 are larger in diameter than sprockets 152 and 153, this arrangement acts as a multiplier so that the distance carriages 26 and 27 move is greater than the distance rack 158 moves, but is proportional to the distance the rack 158 moves.

In the preferred embodiment, it has been found that it is advantageous to construct the rack 1 so that at least five pallets are deposited on each shelf or pair of ledges. Hence, the racks are so constructed that five pallets in end-to-end relation will substantially fill the shelf of a rack, as shown at FIG. 1A for pallets 200-204' As will also be observed with reference to FIGS. 1 and 1A, each pallet is generally rectangular, is somewhat wider than it is long, and has a height somewhat less than the distance between adjacent ledges or shelves of the rack. The arrangement for grouping pallets in groups of five for loading onto a rack will now be described with reference to FIGS. 4, 5, and 11. As shown at FIGS. 4 and 5, a front gate 204 is connected to infeed conveyor 24 at a location slightly to the left of roller 92. Spaced from front gate 204 is a rear gate 205. The spacing between the gates is greater than the length of a group of five tiles, but less than the length of a group of six tiles. At one side of conveyor 24 are five light sources 211–215. The light sources 211–215 are so arranged that light from source 211 is directed toward photocell 206, light from source 212 is directed toward photocell 207, etc. The light source for each photocell projects a beam perpendicular to the longitudinal axis of conveyor 24 and the light sources and photocells are so positioned that a pallet on the conveyor between a light source and its associated photocell blocks the light beam from the source.

Referring now to FIG. 11, the manner in which pallets are arranged in groups of five will now be explained. Front gate 204 is connected to an air cylinder 216 which moves the front gate from a retracted position as shown, to an extended position in the path of travel of pallets on conveyor 91. Connected in line 217, leading to the piston rod end of cylinder 216, is a solenoid valve 218. Air is supplied to the valve from an air pressure source 219. Connected in line 220, which runs from air pressure source 219 to the head end of cylinder 216, is a solenoid valve 221.

Similarly, rear gate 205 is raised and retracted by a cylinder 222. The cylinder has a line 223 connected between its piston end and an air pressure source 219, and a valve 224 is in line 223. Similarly, a solenoid operated valve 226 is connected in line 225 which extends between the pressure source 219 and the head end of cylinder 222.

Photocells 206–210 are connected respectively to operate double pole double throw relays 227–231. Since the circuitry for operating a relay in response to a light or dark condition of a photocell is well known in the art, such circuitry is not shown in detail. Each of relays 227–231 has a first movable contact 232 and a second movable contact 233 as shown, for example, for relay 227. Whenever a pallet is in a position to block the light beam from a light source to its associated photocell, the relay controlled by the photocell has its contacts 232 closed, and contacts 233 are open. Hence, with pallets 234–238 in the positions shown at conveyor 91, all photocells are dark and contacts 232 of all the relays 227–231 are closed. With contacts 232 closed, a circuit is completed which energizes coil 239 to open valve 218 and energizes coil 240 to open valve 226. Opening valve 218 conducts air to the piston rod end of cylinder 216 to retract front gate 204 to the position shown at FIG. 11. Opening valve 226 directs air to the head end of cylinder 222 to extend rear gate 205 to the position shown, in the path of travel of pallets on conveyor belt 91. As soon as gate 204 is lowered, the pallets 234–238 move to the right as a group in closely adjacent relation to each other and are conveyed onto loading conveyor arm 23 in the same closely grouped formation. As soon as rear face 245 of pallet 234 passes photocell 206, the photocell receives light from its light source and switches its associated relay 227 so contact 232 opens and contact 233 closes. The effect of opening contact 232 is to deenergize coil 240 of valve 226 and coil 239 of valve 218. The effect of deenergizing these valves is merely to move the valves to a second position in which the valves vent the respective ends of the cylinders to which they are connected. Hence, neither front gate 204 nor rear gate 205 is operated and these gates remain in the position shown at FIG. 11.

As the tiles 234–238 of the group further advance, photocells 207, 208, and 209 will become illuminated by their associated light sources in succession. Correspondingly, relays 228, 229, and 230 will successively be switched so contacts 233 close. When relay 230 is switched so its contacts 233 close, a circuit is completed which energizes coil 246 of valve 223, thereby admitting air to the piston end of cylinder 222 and retracting rear gate 205. As soon as rear gate 205 is retracted, the pallets to the left of the gate are released and are conveyed by the continuously moving belt 91 in a direction toward front gate 204.

As the first group of pallets is conveyed away by belt 91, the rear face 245 of pallet 234 will ultimately pass photocell 210. When photocell 210 receives light from its source, relay 231 is switched and its contacts 233 close to energize coil 247 to actuate valve 221. With valve 221 actuated, air is admitted to the head end of cylinder 216 to raise front gate 204 to its extended position in which it blocks travel of pallets on conveyor belt 91. In series with coil 247 is a time delay device 248 which delays operation of coil 247 for a fraction of a second sufficient to permit pallet 234 to pass over the front gate before the gate is raised. As a second set of pallets is released by rear gate 205, these pallets will be stopped by the front gate and will sequentially block the light from the source for photocells 206–210 and correspondingly, the contacts of relays 227–231 will be returned to the position shown in FIG. 11, in which contacts 232 are closed and the cycle is then repeated.

It is to be appreciated that pallets travelling along the conveyor may be slightly spaced from each other, or may be very irregularly spaced so the light source to any one of the photocells may be the last to be interrupted. To reduce the danger of damage to the tiles on pallets 234–238 when these pallets are stopped by gate 204 and subsequently bump each other, front gate 204, as well as rear gate 205, is made resilient to give slightly and absorb some of the shock. However, the worst situation that can be encountered is where pallets 235–238 have already been arrested and last tile 234 is still moving toward the group. By virtue of the weight of tiles 235–238 and their stopped condition on belt 91, if pallet 234 were permitted to bump the group of pallets, the resulting shock could damage the wet tile supported by pallet 234. Severe bumping is avoided by the spacing of the photocells 206–210. As shown at FIG. 11, a pallet has a length L. The spacing between adjacent photocells 206–210 is made slightly greater than this length L of a pallet. This length is indicated as L+A. While the distance A will vary with the length of the pallets, a distance A equal to three quarters of an inch when tiles twelve and three eighths inches long are conveyed provides extremely good results with no damage to the tiles supported by the pallets. In this regard, it will be observed that if a group of four pallets 235–238 is arrested by front gate 204, and a pallet 234 is still travelling toward the group, the front of the pallet 234 will darken photocell 206 while the pallet is still spaced from the rear face of pallet 235. By virtue of the time delay device 248, pallet 234 will have moved to a position close to the adjacent pallet 235 when gate 204 is lowered and hence, the group of pallets including the pallet 235 will already be moving when pallet 234 engages the rear face of pallet 235. Hence, the shock of engagement is vastly reduced and no damage to the delicate wet tile supported by pallet 234 occurs.

AUTOMATIC CONTROLS AND OPERATION

Rack conveyor 40 automatically moves racks, for example, the rack 42 (FIG. 2) into position where a row of a rack, for example, row A of rack 42 is in precise axial alignment with loading arm 23. Such precise movement and register of row A of rack 42, as well as the remaining rows of a rack, is obtained by a control including a light source 250 and a photocell 251 mounted on lower frame 38, as shown at FIG. 6. With reference to FIG. 8, it will be seen that light source 250 directs a beam of light 252 toward rack conveyor 40 and, when beam 252 is reflected from a polished reflective surface, a reflected beam 253 is received by photocell 251.

Figure 12:
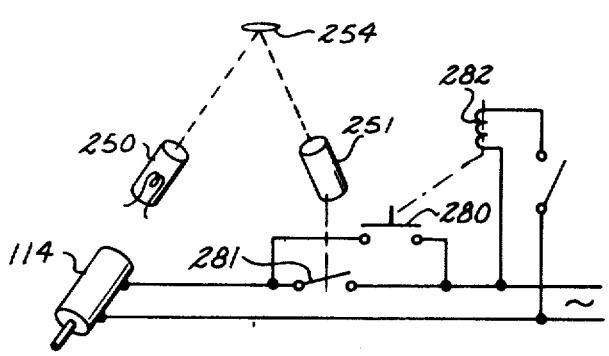
FIG. 12 is a circuit diagram and schematic showing of the control system for the rack conveyor.

As shown at FIG. 1, there are three highly reflective surfaces 254–256 mounted respectively on uprights 3–5 at the front of each rack 1. Surfaces 254–256 may take the form of highly polished spots on the upright or alternatively, small highly polished discs of metal secured to the uprights. To precisely position a rack with its first row, namely, the row 6 of rack 1 in alignment with loading arm 23, it is merely necessary to start drive motor 114 of the conveyor by closing switch 280, FIG. 12, whereupon the rack is conveyed by chains 123 until a reflected beam of light 253 is received by photocell 251. The arrangement between photocell 251 and drive motor 114 is such that relay 281, FIG. 12, is closed and the motor continues to run so long a photocell 251 is dark, but immediately stops when a strong light beam is received by the photocell to open relay 281. Hence, when a spot, such as spot 254, reflects beam 252, a rack row is in precise alignment with the loading arm 23 and photocell 251 automatically stops motor 114 of the rack conveyor by opening the contacts of relay 281.

Figure 13:
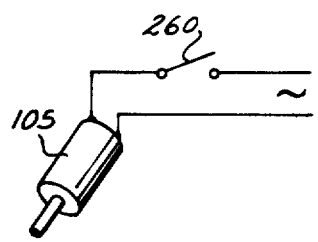
FIG. 13 is a circuit diagram showing the control arrangement for starting and stopping the loading and unloading arm conveyors.

While frame 25 is in the retracted position of FIG. 2, carriage 27 is elevated to its uppermost position and carriage 26 is lowered to its lowermost position so loading arm 23 and unloading arm 21 are in their start positions for simultaneously loading and unloading rows of racks on a rack conveyor. Then, frame 25 is advanced so the arms enter rows of racks which are aligned with the respective arms. At the beginning of the loading of row 6 of rack 1, loading conveyor 23 is positioned so its conveyor chain 87 is slightly above the level of the uppermost shelves of row 6. During the forward movement of frame 25, neither conveyor belt 91 nor chain 87 is driven. Mounted at the front of rail 60 is a limit switch 260 in series with motor 105 (FIG. 13). Limit switch 260 is normally open, but is closed when the front face 261 of lower frame 38 engages the switch. Actuation of switch 260 energizes drive motor 105 to drive belt 91 of infeed conveyor 24 and chain 87 of loading arm 23.

A group of pallets, namely five pallets, are then conveyed from infeed conveyor 24 and along loading arm 23. Mounted adjacent the free end of loading arm 23 is a limit switch 262 which when actuated energizes a coil 263 (FIG. 10) of solenoid valve 189 to actuate trip cylinder 188. When the trip cylinder is actuated, loading arm 23 is indexed downwardly one step, and unloading arm 21 is indexed upwardly the same distance. (Belt 91 and chain 87 are driven continuously during loading of an entire row of a rack.) The distance of the indexing motion is the same as the distance between adjacent ledges of a rack. As each new group of pallets is conveyed along loading arm 23, limit switch 262 is actuated to repeat the indexing motion.

When the lowest row of a rack is loaded, the pin 186 (FIG. 10) of trip rod 177 rides on the top surface of portion 265 of rack 158. With trip rod 177 in this position, valve 175 is open and hence, rack 158 moves to the left, thereby moving loading arm 23 downwardly to the position shown for the loading conveyor arm 23' of FIG. 1. As the piston of cylinder 161 reaches the end of its travel to the left, the left hand end of toothed rack 158 engages limit switch 266 which is connected to actuate cylinder 67 to retract frame 25 and the conveyor arms to the solid line position shown at FIG. 2. As frame 25 and lower frame 38 are retracted, face 261 of lower frame 38 moves away from limit switch 260 and as soon as this switch opens, drive motor 105 is turned off. A second limit switch 270 is mounted on base 39 at the rear of the base as shown at FIG. 7, and schematically at FIG. 2.

Figure 14:
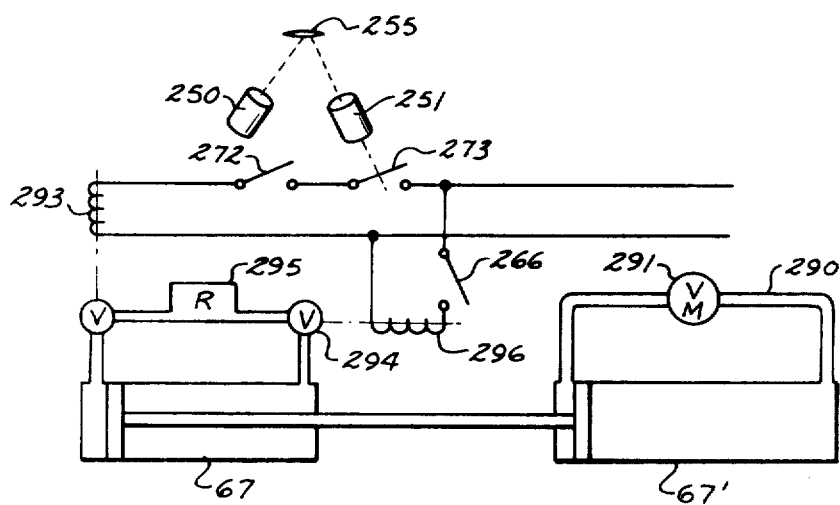
FIG. 14 is a schematic and circuit diagram showing the control of the fluid motor for advancing and retracting the frame on which the loading and unloading arms are mounted.

When frame 25 is fully retracted, limit switch 270 (FIG. 12) is actuated to initiate two actions. First, switch 280 (FIG. 12) is momentarily closed by energizing the coil 282 of a short time actuator which allows switch 280 to open one second or so after it is closed. Such short actuation of switch 280 energizes drive motor 114 of rack conveyor 40 and the initial driving motion moves the rack so the polished surface 254 no longer reflects light, photocell 251 becomes dark and switch 281 closes, whereupon motor 114 remains energized until light from lamp 250 is again reflected at photocell 251 by the next reflective spot on the rack. When the next reflective spot reflects a light beam to photocell 251, switch 281 opens to stop motor 114 with the next row of the rack in precise alignment with loading arm 23. In addition, actuating limit switch 270 energizes coil 271 of valve 171 (FIG. 10) to reverse the valve so air is directed against the left hand side of the piston of cylinder 160. Simultaneously, valve 171 vents the head end of cylinder 160. The pressure on the left hand face of the piston of cylinder 160 causes the piston to move to the right to move toothed rack 158 and bar 157 also to the right. During such motion, trip bar 177 is also moved to the right by spring 184 so its collar 180 engages front face 183 of plate 178. Hence, valve 175 remains open and a liquid is drawn into the piston rod end of cylinder 161 during such reverse movement of the rack. Valve 175 presents a slight restriction to limit the speed at which the piston of cylinder 160 can move to the right. Since bar 157 is connected to chain 154 which drives sprockets 150 and 151, carriage 27 is again lifted to its elevated position and carriage 26 is lowered. When toothed rack 158 reaches its extreme limit of right hand travel, it engages a limit switch 272. Limit switch 272 is in series with a switch 272 (FIG. 14). Switch 273 is controlled by photocell 251, so switch 273 is closed when a polished spot, for example, a spot 255 reflects light to the photocell from lamp 250. Such reflection with corresponding illumination of photocell 251 only occurs when a row of the rack is in precise alignment with the loading arm 23. The arrangement including the limit switch 272 and the photocell controlled switch 273, assures that the loading arm is in its proper top position and that the row of a rack is precisely aligned with the arm before frame 25 can be advanced to move the arm through the row of the rack.

A shown at FIG. 14, pneumatic cylinder 67 cooperates with hydraulic cylinder 67' to move frame 25 from its retracted to its advanced position. The piston rod and head ends of cylinder 67 are interconnected by a line 290 containing a metering valve 291. Pneumatic cylinder 67 includes a solenoid valve which supplies air under pressure to the head end of the cylinder when coil 293 is energized. When coil 293 is energized by closing switches 272 and 273, air pressure forces the piston of cylinder 67 to the right to advance the frame, and the rate at which such movement occurs is limited by the resistance from hydraulic fluid forced through the metering valve 291 from the head end to the piston end of hydraulic cylinder 67'.

As also shown at FIG. 14, solenoid valve 294 is connected in a line between air pressure source 295 and the piston rod end of cylinder 67. Actuating coil 296 of valve 294 is connected in series with limit switch 266 and correspondingly, when toothed rack 158 (FIG. 10) reaches its left hand limit of travel, valve 294 opens to admit air under pressure to the piston rod end of cylinder 67, thereby retracting frame 25. Limit switch 266 assures that loading arm 23 is at its bottom position, where a row of a rack is completely loaded, before cylinder 67 can be actuated to retract frame 25.

When frame 25 reaches its advanced position, limit switch 260 is again actuated and the row of the rack through which loading arm 23 extends is loaded automatically in the manner previously described.

While the operation described has been for the loading arm, it is to be understood that the operation of unloading arm 21 is identical to that of loading arm 23, save that the unloading arm starts its operation with the arm at its bottom position and with the conveyor chain of the arm slightly beneath the bottom shelf or ledges of a row of a rack. The belt of outfeed conveyor 22 and the chain of unloading arm 21 are driven whenever the infeed conveyor and loading arm are driven.

OPERATION

To make full use of all pallets, all pallets are loaded with concrete tile, are loaded in racks, and the racks are placed in suitable ovens to cure the tiles. After the tiles are cured, a first rack is removed from the curing oven and placed on the rack conveyor so its pads 132 and 133 sit on pads 127 and 128 of conveyor chain 123. Then, rack conveyor 40 is started to move the first loaded row of the rack into alignment with unloading arm 21. Next, frame 25 is advanced so the unloading arm enters under the bottom pallet on the first row of the rack. Indexing of the unloading arm upwardly to successively unload the shelves of the rack is preferably accomplished manually by closing switch 300 to actuate trip cylinder 188. Actuating the trip cylinder causes the unloading arm to index upwardly just far enough to lift the bottom group of pallets from the shelf of the rack, and since the unloading conveyor chain is running continuously, the pallets are conveyed to the outfeed conveyor 22. As soon as the group of pallets leaves unloading arm 21, switch 300 is again energized. After the top group of pallets is removed from the row of the rack, frame 25 automatically retracts, the loading arm is automatically lowered, and rack conveyor 40 is again started to convey the rack so a new row is aligned with unloading arm 21. During this initial unloading operation, conveyor 40 is stopped manually with the next full row in alignment with the unloading arm. Then, frame 25 is again advanced to extend unloading arm 21 through the next row. This procedure is continued until the rows of several racks have been unloaded.

As the pallets are unloaded, they are conveyed to a de-palletizer (not shown) and are then re-routed to the tile forming machinery from which pallets containing wet tile are transported along infeed conveyor 24 to loading arm 23. When at least one rack is unloaded, so it is available to be positioned in the position of rack 42, FIG. 2, full automatic operation of the apparatus is initiated, and such automatic operation continues, simultaneously unloading one row of a first rack while simultaneously loading a second row of another rack. As racks are filled with pallets supporting wet tile and are moved to the position of rack 43, a fork lift truck is used to lift the rack from the conveyor and to immediately transport the rack to a curing oven.

While a preferred embodiment of the apparatus of this invention has been shown and described in detail, it is to be understood that numerous changes can be made without departing from the intended scope of this invention, as defined in this specification and the appended claims.

What is claimed is:

1. A conveyor system to load articles on a rack of the type having a row of spaced apart article supporting ledges comprising, in combination a horizontal arm conveyor having a width less than the distance between ledges of said rack;
   first support means for said conveyor arm;
   means mounting said conveyor arm on said first support means for vertical movement while maintaining said arm horizontal;
   means mounting said first support means for movement
   to a first position on which said arm extends substantially into and between the article supporting ledges of a rack, and
   to a second position in which said arm is retracted and spaced from the rack; a conveyor pivotally supported at one end by said first support means, said one end being vertically movable with said horizontal arm and being adjacent one end of said arm, whereby articles conveyed by said conveyor are transferred to said arm;
   means continuously driving said conveyor during the loading of a row of a rack;
   means continuously driving said arm conveyor during the loading of a row of a rack;
   means to index said arm conveyor vertically to plural positions in each of which an article supporting surface of the arm conveyor is slightly above the article supporting ledges of the rack, whereby an article on said arm is deposited on said ledges by downward indexing movement of the arm; and
   means responsive to the movement of at least one article to a predetermined position on said arm conveyor to automatically activate said index means to move said arm conveyor vertically a distance equal to the vertical distance between ledges of the rack.

2. A conveyor system according to claim 1 wherein a rack conveyor extends transversely in front of said conveyor arm, said rack conveyor being operable to transport a rack in a direction transversely of said arm; and means to operate said rack conveyor to automatically position a row of a rack on the conveyor in alignment with said arm.

3. A conveyor system according to claim 1 wherein said system further includes means responsive to loading the row of a rack to automatically actuate said mounting means for said arm conveyor to move same to second position.

4. A conveyor system according to claim 1 wherein said system further includes a rack conveyor to precisely align a row of a rack with said conveyor arm; and means to actuate said conveyor to align an immediately adjacent row of a rack with said arm in response to movement of said mounting means for said first support means to said second position.

5. A conveyor system according to claim 1 wherein said means mounting said first support means for movement is an upright frame; and said first support means includes a cradle mounted on said frame for vertical movement to a plurality of spaced apart horizontal positions.

6. A conveyor system according to claim 1 wherein said system further includes means to automatically return said means mounting said conveyor arm on said first support means to a start position in which said arm conveyor is at the top of a row of a rack to be loaded;

said rack is mounted on a conveyor including means to move the rack in a direction transversely of said arm conveyor; and means to move said means mounting said first support means to said first position in response to movement of said arm to said start position, and alignment of a row of a rack on said rack conveyor with said arm;

whereby, said arm conveyor is moved to said first position only if it is in a proper start position and is aligned with a row of a rack on the rack conveyor.

7. A conveyor system according to claim 1 wherein a rack conveyor extending transversely of said arm automatically moves a rack thereon to a position in which a next row of the rack is aligned with said arm, in response to movement of said means mounting said first support means to said second position;

means responsive to movement of said means mounting said first support means to said second position is effective to actuate said first support means to move to a position in which said arm conveyor is in a start position, and actuate said rack conveyor to move a rack to a position in which a next adjacent row of the rack is in alignment with said arm conveyor; and means responsive to alignment of the next adjacent row of a rack with said arm and movement of said arm to a start position to automatically actuate said mounting means to move said support means to said first position.

8. Apparatus for loading pallets on a rack comprising, in combination an infeed conveyor system including
an infeed conveyor, and
a loading arm conveyor;

a frame;

carriage means mounting said loading arm conveyor on said frame for vertical movement while maintaining said arm horizontal;

means pivotally connecting said infeed conveyor to said carriage at one end for pivotal movement relative to said conveyor arm;

a rack conveyor extending transversely of said arm and in front of said frame;

a rack on said rack conveyor, said rack including
a plurality of side by side rows, each including a plurality of pairs of shelf ledges to support a plurality of pallets, said ledges being spaced apart to permit vertical movement of said arm therebetween;

means to index said arm vertically a distance equal to the distance between adjacent shelves of a row;

means mounting said frame on a base for fore and aft movement to extend said arm into a row of a rack and to retract said arm from a row;

means responsive to indexing said arm to a position below the bottom shelf of a row to move said frame to the aft position;

means responsive to movement of said frame to the aft position to actuate said rack conveyor to move a new row of a rack into alignment with said arm;

means responsive to movement of said frame to the aft position to move said arm to an upper position on said frame;

means responsive to moving a new row into alignment with said arm to move said frame to a forward position; and means responsive to a predetermined number of pallets on said arm to index said arm downwardly.

9. Apparatus according to claim 8 which further includes means upstream of said loading arm conveyor to arrange articles in groups of a predetermined number for loading on said rack;

said groups having a total length approximately equal to the length of a pair of ledges of the rack.

10. Apparatus according to claim 8 wherein said means to move a new row of a rack into alignment with said arm includes a light source, and light responsive means, responsive to a change in illumination resulting from movement of said rack, to automatically de-actuate said conveyor in response to movement of a new row of a rack into alignment with said arm.

11. Apparatus according to claim 8 wherein said conveyor conveyor further includes means to precisely align a row of a rack both transversely and longitudinally of said loading arm conveyor.

12. A conveyor system to selectively load a rack, unload a rack, or simultaneously load one row of a rack while unloading another row of a rack, said rack being of the type having at least one row of horizontally aligned pairs of article supporting ledges with the pairs of ledges spaced apart equally vertically and ledges of each pair spaced apart horizontally to receive an arm conveyor of the system therebetween comprising, in combination a first horizontal conveyor arm;
a second horizontal conveyor arm;
a support;
means mounting said conveyor arms on said support in horizontally spaced relation for vertical movement while maintaining the article supporting surfaces of the arms horizontal;
means interconnecting said arms for simultaneous movements, one up and the other down, said means supporting said arms in counterbalanced relation to each other; and
means to simultaneously index said arms vertically in step by step fashion.

13. A conveyor system according to claim 12 wherein
said means interconnecting said arms for simultaneous movement includes
a chain,
first and second sprocket means supporting said chain at locations generally above said respective first and second arms, and
means imparting indexing motion to at least one of said sprockets to simultaneously move said first arm down and said second arm up the same distance.

14. A conveyor system according to claim 12 wherein
a rack conveyor extends transversely of said first and second arms, said rack conveyor including means to simultaneously align a row of a first rack with said first arm and row of a second rack with said second arm; and
means associated with said rack conveyor to actuate same to automatically move a second row of one rack to a position in alignment with said first conveyor arm and to simultaneously move a second row of another rack into alignment with said second conveyor arm.

15. A conveyor system according to claim 12 wherein
said support is mounted on a base for movement in a direction longitudinally of said arms
to a first position in which each of said arms is completely withdrawn from a row of a rack, and
to a second position in which each of said arms is in a forward position and extends through a row of a rack.

16. A conveyor system according to claim 12 wherein
said means to simultaneously index said arms vertically includes
a pneumatic cylinder having a piston rod,
means maintaining constant pressure on the piston of said pneumatic cylinder,
a hydraulic cylinder having a piston rod,
a liquid filling said hydraulic cylinder, and a valve to release said liquid,
means connecting said piston rods together for simultaneous movement,
an index device connected to one of said piston rods for movement therewith,
means responsive to actuation of said index device to open a valve of said hydraulic cylinder to release the piston of the hydraulic cylinder for movement with the piston of the pneumatic cylinder, and
means responsive to a predetermined movement of said index device to close said valve;
whereby, constant pressure on said air cylinder causes movement of the piston of the air cylinder and hydraulic cylinder simultaneously in response to opening said valve.

17. A conveyor system according to claim 12 wherein
an infeed conveyor has an end pivotally connected to a support for said first horizontal conveyor arm;
an outfeed conveyor has an end pivotally connected to a support for said second horizontal conveyor arm;
whereby, the weight of said infeed conveyor, first horizontal conveyor arm, and objects thereon are counterbalanced by the weight of said outfeed conveyor, second horizontal conveyor arm, and articles thereon via said means supporting said arms in counterbalanced relation to each other.

18. A conveyor system according to claim 15 wherein
said system further includes
means to drive said first conveyor arm and said infeed conveyor to transport articles in a first direction, and
means to drive said second conveyor arm and said outfeed conveyor to transport articles in a second direction opposite to said first direction; and
means to actuate said means to drive said infeed conveyor and first conveyor arm in response to movement of said support to said second position.

* * * * *